United States Patent Office 3,842,082
Patented Oct. 15, 1974

3,842,082
4-PIPERAZINYL-10H-THIENO[3,2-c]
[1]BENZAZEPINES
Fritz Hunziker, Bern, Switzerland, assignor to Wander Ltd. (also known as Wander AG), Bern, Switzerland
No Drawing. Filed Nov. 20, 1972, Ser. No. 307,924
Claims priority, application Switzerland, Nov. 26, 1971, 17,225/71
Int. Cl. C07d 51/70
U.S. Cl. 260—268 TR    14 Claims

ABSTRACT OF THE DISCLOSURE

The present invention concerns novel compounds of the formula,

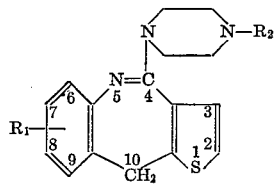

wherein
$R_1$ is hydrogen, halogen, alkyl, alkoxy or alkylthio, and
$R_2$ is hydrogen, alkyl, hydroxyalkyl, acetoxyalkyl, or alkoxyalkyl,
useful as neuroleptics, and sleep-inducing and -promoting agents.

---

The present invention relates to 10H-thieno[3,2-c][1]benzazepine derivatives.

The present invention provides new compounds of formula I,

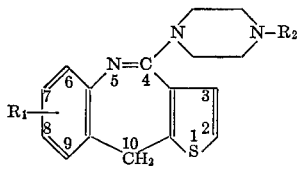

wherein $R_1$ is hydrogen, fluorine, chlorine or bromine, or alkyl, alkoxy or alkylthio of 1 to 4 carbon atoms, and $R_2$ is hydrogen, alkyl of 1 to 4 carbon atoms, hydroxyalkyl of 1 to 4 carbon atoms, acetoxyalkyl of 3 to 6 carbon atoms or alkoxyalkyl of 2 to 6 carbon atoms.

Further, in accordance with the invention a compound of formula I may be obtained by a process comprising
(a) reacting a compound of formula II,

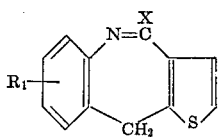

wherein $R_1$ is as defined above, and
X is a radical capable of being split off with the hydrogen atom on one of the nitrogen atoms of piperazine,
with a compound of formula III,

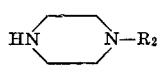

wherein $R_2$ is as defined above, to produce a compound of formula I,
(b) subjecting to a ring closure a compound of formula

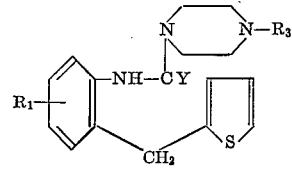

wherein $R_1$ is as defined above,
Y is an oxygen or sulphur atom, and
$R_3$ (i) is a protective radical capable of being split off, and simultaneously or subsequently splitting off the protective radical to produce a compound of formula I wherein $R_2$ is hydrogen, or
(ii) has one of the significances of $R_2$
to produce a compound of formula I,
(c) alkylating a compound of formula I wherein $R_2$ is hydrogen, with an alkylating, hydroxyalkylating or alkoxyalkylating agent to produce a compound of formula I wherein $R_2$ is alkyl, hydroxyalkyl or alkoxyalkyl, respectively, or
(d) acetylating a compound of formula I wherein $R_2$ is hydroxyalkyl to produce a compound of formula I wherein $R_2$ is acetoxyalkyl.

Process variant (a) may be effected as follows:
In a compound of formula II, the reactive radical X may be, for example, a substituted-thio or -oxy group, conveniently the sulfhydryl group, an alkoxy or alkylthio group containing 1 to 5 carbon atoms, e.g. the methoxy or methylthio group, an aryloxy, aralkylthio or arylthio group which may be activated as a leaving group by substituents thereon conveniently in the aryl moiety thereof, e.g. the p-nitrobenzylthio group, an alkyl- or arylsulfeno group, which preferably is activated as a leaving group by substituents on the sulfur atom and the hydrocarbon moiety thereof, e.g. a tosyl group.

The reactive radical X may alternatively be, for example, a halogen atom, conveniently the chlorine atom.

The reactive radical X may, alternatively, signify an amino group or a mono- or dialkyl-substituted amino group, the or each alkyl substituent thereof containing 1 to 5 carbon atoms (hereafter the term "amino group" with reference to a compound of formula II refers to any of these three afore-mentioned groups).

The compound of formula II, which may be used in crude form, may be reacted with a compound of formula III in an inert solvent, for example an aromatic hydrocarbon solvent, e.g. xylene, or a cyclic ether, e.g. dioxane. Alternatively if the compound of formula III is liquid at the reaction temperature, an excess of this compound may be used as the reaction medium, especially when the radical X in the compound of formula II is an amino group.

The temperature of the reaction is preferably from room temperature to the temperature of the reaction mixture boiling under reflux, preferably from 50 to 175° C. Suitable catalysts may be present in the reaction mixture, especially when the radical X in the compound of formula II is an amino group. A convenient catalyst is an acid, e.g. toluenesulfonic acid or sulfuric acid, or an acid addition salt of an amine, e.g. a compound of formula II in hydrochloride salt form, or ammonia, e.g. ammonium chloride.

Process variant (b) may be effected as follows:
A compound of formula IV may be subjected to a ring closure preferably at a temperature from 50° C. to the temperature of the reaction mixture boiling under reflux, conveniently in the presence of a dehydration and ring closure agent, e.g. zinc chloride, aluminium chloride, tin tetrachloride, polyphosphoric acid, phosphorus pentasulfide, phosphorus oxychloride or phosphorus pentoxide.

A preferred method of effecting ring closure is by heating to the boil a compound of formula IV and phosphorus oxychloride, or a compound of formula IV and phosphorus oxychloride in the presence of phosphorus pentoxide, conveniently from 10 to 20 hours.

If the reaction mixture is liquid, ring closure may be effected without additional solvent, otherwise an inert solvent such as benzene, xylene or toluene may be used.

When $R_3$ in the formula IV signifies a protective radical, this may be preferably a group capable of being split off hydrolytically or hydrogenolytically in known manner, e.g., a carbalkoxy group, preferably the carbethoxy group or the carbobenzoxy group.

For example, depending on the reaction conditions used, a compound of formula IV having a carbethoxy group $R_3$ is cyclized as such to the corresponding 11-(1-piperazinyl) compound of formula I wherein $R_2$ is hydrogen, hydrolysis and removal of the $R_3$ group simultaneously taking place.

The carbobenzoxy group may be removed in known manner, e.g. hydrogenolytically, after ring closure to produce a compound of formula I wherein $R_2$ is hydrogen.

Process variant (c) may be effected as follows:

Alkylation of a compound of formula I wherein $R_2$ is hydrogen, may be effected by reaction with an alkylation agent, for example an alkanol of the formula IX, $$R_2OH \qquad \qquad IX$$

wherein $R_2$ is alkyl of 1 to 4 carbon atoms, in the form of a reactive ester, to produce the corresponding compound of formula I wherein $R_2$ is alkyl.

Representative reactive esters are esters of organic or inorganic acids, e.g. toluenesulfonic acid or a hydrohalic acid, particularly hydrogen iodide.

The reaction is conveniently effected by dissolving a compound of formula I wherein $R_2$ is hydrogen in an inert solvent, preferably an aromatic hydrocarbon, e.g. toluene, or a polar solvent, e.g. acetone or isopropanol. An acid-binding agent may be preferably present, e.g. potassium or sodium carbonate, or an excess of the compound of formula I wherein $R_2$ is hydrogen.

The temperature of the reaction may be, e.g., from room temperature (about 25° C.) to the temperature of the reaction mixture boiling under reflux.

An alternative alkylation agent is a reductive alkylation agent, comprising the aldehyde corresponding to the alkanol of formula IX, in the presence of a reducing agent, for example formic acid, conveniently 90% formic acid, or catalytically activated hydrogen, in the presence of an inert solvent, if necessary.

The reaction temperature may be, e.g., from room temperature to the temperature of the reaction mixture boiling under reflux.

The hydroxyalkylation of a compound of formula I wherein $R_2$ is hydrogen, may be effected by reacting this compound of formula I with a reactive monoester of a glycol of 1 to 4 carbon atoms, conveniently in a manner analogous to that described above for alkylation with a reactive ester, to produce the corresponding compound of formula I wherein $R_2$ is hydroxyalkyl. In an alternative method, this compound of formula I may be treated with a suitable alkylene oxide of 1 to 4 carbon atoms, conveniently in a pressure tube, and by heating to a temperature conveniently from 80 to 120° C. to produce the corresponding compound of formula I wherein $R_2$ is hydroxyalkyl. An inert organic solvent, e.g. toluene, may be used.

The alkoxyalkylation of a compound of formula I wherein $R_2$ is hydrogen, may be effected by reaction of this compound of formula I with a reactive ester of an alcohol of formula IX, wherein $R_2$ is alkoxyalkyl of 2 to 6 carbon atoms, conveniently in a manner analogous to that described above for alkylation with a reactive ester, to produce the corresponding compound of formula I wherein $R_2$ is alkoxyalkyl.

In accordance with process (d) of the invention, compounds of formula I wherein $R_2$ is hydroxyalkyl, may be acetylated by, for example, treatment with a reactive derivative of acetic acid, e.g. acetic anhydride. An acid-binding agent, e.g. pyridine, or excess compound of formula I wherein $R_2$ is hydrogen, may be conveniently present.

The compounds of formula I obtained in accordance with the invention may be isolated in known manner, e.g. by precipitating from the reaction mixture, or concentrating the reaction mixture by evaporation, and may be purified in known manner, e.g. by recrystallization. The free base forms of the resulting compounds of formula I may be converted into acid addition salt forms in conventional manner and *vice versa*.

The compounds of formula II, used as starting materials in process variant (a) may be obtained:

(a') by treating in known manner a compound of formula V,

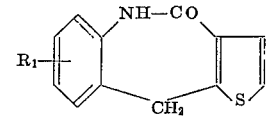

wherein $R_1$ is as defined above, with a halogenating agent, e.g. a chlorinating agent such as phosphorus oxychloride or phosphorus pentachloride, preferably in the presence of a catalytic amount of an amine such as dimethyl aniline or dimethyl formamide, to produce a compound of formula II wherein X is the corresponding halogen, e.g. chlorine, (b') by treating a compound of formula II wherein X is halogen, with an alcoholate of 1 to 5 carbon atoms and preferably of an alkali metal to produce a compound of formula II wherein X is alkoxy, (c') by converting a compound of formula V in known manner into the thiolactam, thereby obtaining the corresponding tautomer of formula II wherein X is sulfhydryl, (d') by alkylating a compound of formula II wherein X is sulfhydryl in known manner or by treating a compound of formula II wherein X is halogen, with ammonia or a mono- or dialkyl-amine, to produce a compound of formula II wherein X is an amino group or a mono- or dialkyl-substituted amino group.

A compound of formula V may, for example, be obtained by ring closure of a compound of formula VI,

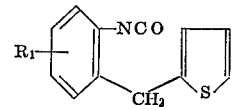

wherein $R_1$ is as defined above, in the presence of, for example, phosphorus oxychloride and phosphorus pentoxide, or preferably polyphosphoric acid. This reaction may be conveniently carried out at an elevated temperature.

A compound of formula VI may, for example, be obtained by treating a compound of formula VII,

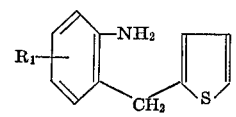

wherein $R_1$ is as defined above, with an isocyanate-forming agent, for example, phosgene.

A compound of formula VII may, for example, be obtained by reducing for example with hydrazine a compound of formula VIII,

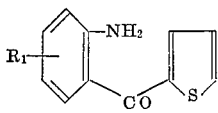

wherein $R_1$ is as defined above.

The compounds of formula VIII are known or may be produced in conventional manner.

The compounds of formula IV, used as starting materials in process variant (b), may, for example, be obtained by treating a compound of formula VII with phosgene or thiophosgene, and reacting the resulting isocyanate or isothiocyanate, respectively, with piperazine or a piperazine derivative of formula III, conveniently in an inert solvent, e.g. benzene.

The temperature of the reaction may be, e.g., from room temperature to the temperature of the reaction mixture boiling under reflux.

Insofar as the production of the starting materials is not particularly described, these are known or may be produced and purified in accordance with known processes, or in a manner analogous to processes described herein or to known processes.

The free base forms of the compounds of formula I may be converted into acid addition salt forms in conventional manner, and *vice versa*.

The compounds of formula I have hitherto not been described in the literature.

The compounds of formula I are useful because they possess pharmacological activity in animals. In particular the compounds are useful as neuroleptics as indicated by suppression of locomotor activity in mice on p.o. administration of 0.5 to 5 mg./kg. animal body weight of the compounds, in accordance with the method of Caviezel and Baillod, described in Pharm. Acta Helv. *33*, 465–484 (1958).

For the above-mentioned use, the dosage to be administered will naturally vary depending on the compound used, the mode of administration and the treatment desired. However, in general, satisfactory results are obtained when administered at a daily dosage of from about 0.10 mg. to about 10 mg. per kg. animal body weight, conveniently given in divided doses 2 to 4 times a day or in sustained release form. For the larger mammals, the total daily dosage is in the range from about 5 to about 500 mg., and dosage forms suitable for oral administration comprise from about 1.25 mg. to about 250 mg. of the compound admixed with a solid or liquid pharmaceutical carrier or diluent.

Specific examples of daily doses at which satisfactory results are obtained, are:

(i) 4-(4-methyl-1-piperazinyl) - 10H - thieno[3,2 - c]-[1]benzazepine, from 0.10 to 10 mg./kg. animal body weight administered p.o.; and (ii) 7-chloro-4-(4-(2-hydroxyethyl) - 1 - piperazinyl)-10H-thieno[3,2-c][1]benzazepine, from 0.25 to 10 mg./kg. animal body weight administered p.o.

The compounds of formula I are furthermore useful as sleep-inducing and promoting agents, as indicated by a rise of the electrographic arousal threshold in rabbits on i.v. administration of 0.5 to 5 mg./kg. animal body weight, of the compounds, in accordance with the method of Stille et al. described in Int. J. Neuropharmacology *4*, 375–391 [1965], and in the case of the compounds of formula I wherein $R_1$ is hydrogen, as further indicated by an increase in the deep sleep phase in rats on p.o. administration of the compounds in accordance with the method of Stille et al. described in 11 Farmaco Vol. 26, *10*, 603–625 at page 616 described in paragraph d.

For this use the dosage will, of course, vary depending on the compound employed, mode of administration and treatment desired. However, in general, satisfactory results are obtained when administered at a daily dosage of from about 0.10 mg. to about 5 mg. per kg. animal body weight, conveniently given in divided doses 2 to 4 times a day or in sustained release form. For the larger mammals, the total daily dosage is in the range from about 5 to about 200 mg., and dosage forms suitable for oral administration comprise from about 1.25 mg. to about 100 mg. of the compounds admixed with a solid or liquid pharmaceutical carrier or diluent.

For this use, specific examples of daily doses, at which satisfactory results are obtained, are:

(i) 4-(4-methyl-1-piperazinyl) - 10H - thieno[3,2-c][1]benzazepine, from 0.1 mg. to 5 mg./kg. animal body weight administered i.v.;

(ii) 4-(4-(2 - hydroxyethyl)-1-piperazinyl)-10H-thieno[3,2-c][1]benzazepine, from 0.25 mg. to 5 mg./kg. animal body weight administered i.v.;

(iii) 4-(4-*tert*-butyl-1-piperazinyl) - 10H - thieno[3,2-c][1]benzazepine, from 0.25 mg. to 5 mg./kg. animal body weight administered i.v.

The compounds of formula I may be administered in pharmaceutically acceptable acid addition salt form. Such acid addition salt forms exhibit the same order of activity as the free base forms and are readily prepared in conventional manner. Representative acid addition salt forms include organic acid salt forms such as the maleate, fumarate and tartrate and mineral acid salt forms such as the hydrochloride, hydrobromide and sulphate. A pharmaceutical composition may comprise a compound of formula I, in free base form or in pharmaceutically acceptable acid addition salt form, in association with a pharmaceutical carrier or diluent. Such compositions may be prepared by conventional techniques to be in the form of, for example, capsules, tablets, suspensions or solutions, for enteral or parenteral administration. Aside from the usual pharmaceutical diluents or carriers, e.g. water, alcohol, talc, stearic acid, natural or hardened oils and waxes, these pharmaceutical compositions may contain suitable preserving, stabilizing, wetting, solubilizing, sweetening, flavouring or colouring agents.

A representative tablet comprises 10 mg. of 4-(4-methyl - 1 - piperazinyl)-10H-thieno[3,2-c][1]benzazepine, 70 mg. of lactose, 5 mg. of maize starch, 5 mg. of talc and 0.1 mg. of magnesium stearate.

In the following Examples the temperatures are indicated in degrees Centigrade and are uncorrected, room temperature is between 20 and 30° C., and the vacuum usually employed is between 8 and 20 mm. Hg, unless otherwise indicated.

EXAMPLE 1

4-(4-Methyl-1-piperazinyl)-10H-thieno[3,2-c][1]benzazepine

[Process Variant(b)]

4.0 g. of 2-[2-(4-methyl-1-piperazinyl)carbonamidobenzyl]thiophene are boiled at reflux with 25 cc. of phosphorus oxychloride for 18 hours. The two-phase reaction mixture is evaporated to dryness in a vacuum, ice water and sufficient ammonia to render the mixture alkaline, are added to the residue and this is subsequently extracted with ether. After washing the ether phase twice with water, the basic components are separated by exhaustive extraction with 1 N acetic acid, are liberated from the extracts with concentrated ammonia and taken up in ether. The ether solution is washed with water, dried with sodium sulphate, filtered through aluminium oxide and concentrated by evaporation. The residue is crystallized from ether/petroleum ether, whereby 4-(4-methyl-1-piperazinyl)-10H-thieno[3,2-c][1]benzazepine is obtained in the form of colourless grains having a M.P. of 145–147°.

The 2-[2-(4-methyl-1-piperazinyl)carbonamidobenzyl]thiophene, used as starting material in this Example, is obtained as follows:

14.8 g. of 2-(2-aminophenyl)thienone, 23.8 g. of solid potassium hydroxide and 19.6 g. of hydrazine hydrate are heated to the boil at reflux in 180 cc. of diethylene glycol for 3 hours. After diluting the reaction mixture with ice water, extraction is effected with ether. The ether phase is washed thrice with water, is dried with sodium sulphate and concentrated. 2-(2-Aminobenzyl)thiophene is obtained in the form of a light yellow oil having a B.P. of 128–130°/0.1 mm. Hg.

46 cc. of a 20% solution of phosgene in toluene are added dropwise at −3° while stirring to a solution of 9.8 g. of the product obtained above in 60 cc. of toluene. The reaction mixture is subsequently allowed to warm to room temperature while passing a stream of phosgene through the same, and is subsequently heated to the boil at reflux for half an hour. After removing the excess phosgene with a stream of nitrogen, the reaction mixture is concentrated in a vacuum and the residue is distilled. 10.8 g. of 2-(2-isocyanatobenzyl)thiophene, having a B.P. of 108°/0.05 mm. Hg, are obtained.

A solution of 4.5 g. of this product in 17 cc. of absolute benzene is subsequently added dropwise within half an hour to a solution of 5 g. of N-methyl-piperazine in 17 cc. of absolute benzene. The reaction mixture is subsequently heated to the boil at reflux for 2 hours and is then completely concentrated in a vacuum. The residue is dissolved in dilute acetic acid, the solution is filtered through charcoal and is made alkaline with concentrated ammonia solution while cooling with ice. The precipitated base is extracted with chloroform, the extracts are washed with water, dried with sodium sulphate, filtered through aluminium oxide and concentrated by evaporation. Crystallization of the residue from acetone/petroleum ether yields 2-[2-(4-methyl-1-piperazinyl)carbonamidobenzyl]thiophene in the form of white needles having a M.P. of 117–119°.

EXAMPLE 2

4-(4-Methyl-1-piperazinyl)-10H-thieno[3,2-c][1]benzazepine

[Process Variant (a)]

5.1 g. of 4,5-dihydro-10H-thieno[3,2-c][1]benzazepin-4-one are boiled at reflux with 40 cc. of phosphorus oxychloride and 1.5 cc. of N,N-dimethyl aniline for 3 hours. The reaction mixture is evaporated to dryness in a vacuum and the residue is evaporated twice more with xylene. The residue, 4-chloro-10H-thieno[3,2-c][1]benzazepine, is subsequently taken up in 10 cc. of absolute dioxane and 30 cc. of N-methyl piperazine are added. The reaction mixture is heated to the boil at reflux for 4 hours and is subsequently evaporated to dryness in a vacuum. Ice water and ammonia are added to the residue and this is extracted with ether. After washing the ether phase twice with water, the basic components are separated by exhaustive extraction with 1 N acetic acid, are liberated from the extracts with concentrated ammonia and are taken up in ether. The ether solution is washed with water, dried with sodium sulphate, filtered through aluminium oxide and concentrated by evaporation. Crystallization of the residue from ether/petroleum ether yields 4(4-methyl-1-piperazinyl)-10H-thieno[3,2-c][1]benzazepine in the form of colourless grains having a M.P. of 145–147°.

The 4,5 - dihydro-10H-thieno[3,2-c][1]benzazepin-4-one, used as starting material in this Example, is obtained as follows:

10.5 g. of 2-(2-isocyanatobenzyl)thiophene (B.P. 108°/0.05 mm. Hg) are heated to 110° with 105 g. of polyphosphoric acid for 1 hour while stirring. The reaction mixture is then made alkaline with concentrated ammonia solution with internal and external cooling with ice, and the resulting precipitate is filtered off. This precipitate is washed with water, treated in acetone with charcoal, filtered, dried and crystallized from acetone. 4,5-Dihydro-10H-thieno[3,2-c][1]benzazepin-4-one is obtained in the form of grains having a M.P. of 225–236° (between 150 and 200° conversion into light needles).

EXAMPLE 3

8-Chloro-4-(1-piperazinyl)-10H-thieno[3,2-c][1]benzazepine

[Process Variant (a)]

A solution of 3.5 g. of 4,8-dichloro-10H-thieno[3,2-c]-[1]benzazepine in 15 cc. of toluene is added dropwise within 15 minutes to a mixture boiling at reflux of 11 g. of anhydrous piperazine and 15 cc. of dioxane. After boiling at reflux for a further 6 hours, the reaction mixture is evaporated to dryness in a vacuum and the residue is stirred at 60° for 15 minutes with a mixture of 20 cc. of glacial acetic acid and 100 cc. of water, whereby most of the material dissolves. The insoluble material is then separated by filtering with suction, the filtrate is treated with charcoal, filtered, and the base is liberated therefrom with concentrated ammonia solution. The liberated base is taken up in chloroform, the chloroform phase is washed with water, dried with sodium sulfate and concentrated by evaporation. After treating with charcoal and recrystallizing the residue from acetone/water, 8-chloro - 4 - (1 - piperazinyl) - 10H - thieno[3,2-c][1]benzazepine, having an indefinite M.P. of about 80–100°, is obtained.

The 4,8 - dichloro - 10H - thieno[3,2-c][1]benzazepine, used as starting material in the above process, is produced as follows:

3.0 g. of 8-chloro - 4,5 - dihydro - 10H - thieno[3,2-c]-[1]benzazepin-4-one, 18 cc. of phosphorus oxychloride and 0.75 cc. of N,N-dimethyl aniline are heated to the boil at reflux for 3 hours. The reaction mixture is subsequently evaporated to dryness in a vacuum and is evaporated thrice more with xylene. The residue is divided between benzene and ice water, the benzene phase is washed with water and aqueous potassium bicarbonate solution, is dried with sodium sulphate and concentrated. After recrystallizing the residue from benzene/petroleum ether, crystals having a M.P. of 135–140°, are obtained.

In a manner analogous to that described for Example 3, 8-bromo- (or 8-fluoro-) 4-(1-piperazinyl)-10H-thieno-[3,2-c][1]benzazepine may be made.

EXAMPLE 4

7-Chloro-4-(1-piperazinyl)-10H-thieno[3,2-c][1]benzazepine

[Process Variant (a)]

3.0 g. of 7-chloro - 4,5 - dihydro - 10H - thieno[3,2-c]-[1]benzazepin-4-one, 18 cc. of phosphorus oxychloride and 0.75 cc. of N,N-dimethyl aniline are heated to the boil at reflux for 3 hours. The reaction mixture is subsequently evaporated to dryness in a vacuum and is evaporated thrice more with xylene. The residue, consisting of 4,7-dichloro - 10H - thieno[3,2-c][1]benzazepine, is taken up in 30 cc. of toluene, and the resulting mixture is added dropwise to a boiling solution of 15 cc. of anhydrous piperazine in 15 cc. of dioxane; the mixture is subsequently heated to the boil at reflux for 6 hours. After working up in a manner analogous as described in Example 3, 7-chloro - 4 - (1-piperazinyl) - 10H - thieno-[3,2-c][1]benzazepine is obtained as crystals having a M.P. of 155–157° (from acetone).

The 8-chloro- (or 7-chloro-) 4,5-dihydro - 10H - thieno-[3,2-c][1]benzazepin-4-one, used as starting materials in Examples 3 and 4, may be obtained as follows:

6 g. of N-p-toluenesulphonyl - 5 - chloro- (or 4-chloro-) anthranilic acid are heated to the boil at reflux for 1½ hours with 10 cc. of thionyl chloride. After evaporating to dryness in a vacuum, the residue is recrystallized from methylene chloride/petroleum ether. The resulting N-*p*-toluenesulphonyl - 5 - chloroanthranilic acid chloride has a M.P. of 134–136° (or N-*p*-toluene-sulphonyl-4-chloroanthranilic acid chloride has a M.P. of 135–140°).

A solution of 6 g. of stannic chloride in 10 cc. of carbon disulphide is slowly added dropwise to a mixture of 7 g. of finely pulverized N-*p*-toluenesulphonyl - 5 - chloro- (or 4-chloro-) anthranilic acid chloride and 3.4 g. of thiophene in 25 cc. of carbon disulphide at the boil under reflux. After the addition is complete, stirring is effected at room temperature for 2 hours. The solvent is subsequently removed by evaporation in a vacuum, the residue is treated with ice water and hydrochloric acid and extracted with ethyl acetate. The ethyl acetate extract is washed with 2 N hydrochloric acid, water and a saturated aqueous potassium bicarbonate solution, is dried with sodium sulphate and concentrated. The evaporation residue is divided between ether and a 1 N aqueous sodium hydroxide solution. The aqueous alkaline solution is acidified with concentrated hydrochloric acid, and the resulting precipitate is filtered with suction. The suction filter residue is washed with water and recrystallized from ethyl acetate/petroleum ether. 2 - (2-*p*-toluenesulphonamido - 5 - chlorophenyl)thienone has a M.P. of 164–167° (or 2 - (2 - *p* - toluenesulphonamido - 4 - chlorophenyl)thienone has a M.P. of 140–141°).

8.4 g. of 2-(2-*p*-toluenesulphonamido - 5 - chloro- (or 4-chloro-) phenyl)thienone are stirred at room temperature with 100 cc. of concentrated sulphuric acid for 4 hours. The reaction product is subsequently poured on ice, and the resulting mixture is made alkaline with concentrated aqueous sodium hydroxide solution while cooling. a precipitate results, which is taken up in ether. The ether solution is washed with water, dried with sodium sulphate and concentrated, whereby a residue is obtained. After treatment with charcoal and aluminium oxide, and recrystallization from ether/petroleum ether, 2-(2-amino-5-chlorophenyl)thienone has a M.P. of 97–98° (or 2-(2-amino-4-chlorophenyl)thienone has a M.P. of 66–72°).

15.5 g. of 2 - (2 - amino - 5 - chloro- (or 4-chloro-) phenyl)thienone, 23.8 g. of solid potassium hydroxide and 19.6 g. of hydrazine hydrate are heated to the boil at reflux in 180 cc. of diethylene glycol for 2 hours. After diluting the reaction mixture with ice water, extraction is effected with ether. The ether phase is washed thrice with water, dried with sodium sulphate and concentrated. 2-(2-amino - 5 - chlorobenzyl)thiophene, having a B.P. of 150–157°/0.1 mm. Hg, (or 2 - (2 - amino-4-chlorobenzyl)thiophene, having a B.P. of 137–140°/0.05 mm. Hg) is obtained as oil.

46 cc. of a 20% solution of phosgene in toluene are added dropwise at —3° while stirring to a solution of 11 g. of 2-(2-amino - 5 - chloro- (or 4-chloro-) benzyl) thiophene in 60 cc. of toluene. The reaction mixture is subsequently allowed to warm to room temperature while passing through a stream of phosgene and is subsequently heated to the boil at reflux for half an hour. After expelling the excess phosgene with a stream of nitrogen, the reaction mixture is concentrated in a vacuum and the residue is distilled. 2-(2-isocyano - 5 - chlorobenzyl)thiophene, having a B.P. of 137–139°/0.1 mm. Hg. (or 2-(2 - isocyanato - 4 - chlorobenzyl)thiophene, having a B.P. of 124–125°/0.05 mm. Hg) is obtained.

Ring closure of 2 - (2 - isocyanato - 5 - chloro- (or 4-chloro-) benzyl)thiophene, using the process described in Example 2, yields 8-chloro-4,5-dihydro-10H-thieno[3,2-c][1]benzazepin-4-one having a M.P. of 280–281° (after recrystallization from dioxane/acetone) (or 7-chloro-4,5-dihydro-10H-thieno[3,2-c][1]benzazepin-4-one having a m.p. of 264–266° [after recrystallization from acetone]).

In a manner analogous to that described in Example 4, 6-methoxy-4-[4-(4-ethoxybutyl)-1-piperazinyl]-10H-thieno[3,2-c][1]benzazepine, 9-methylthio-4-[4-(ethoxybutyl)-1-piperazinyl]-10H-thieno[3,2-c][1]benzazepine, 7-methyl-4-(4-methyl-1-piperazinyl)-10H-thieno-[3,2-c][1]benzazepine, and 4-(4-methyl-1-piperazinyl)-10H-thieno[3,2-c][1]benzazepine, and the corresponding starting materials, 6-methoxy-4,5-dihydro-10H-thieno[3,2-c][1]benzazepin-4-one, 9-methylthio-4,5-dihydro-10H-thieno[3,2-c][1]benzazepin-4-one, 7-methyl-4,5-dihydro-10H-thieno[3,2-c][1]benzazepin-4-one, and 4,5-dihydro-10H-thieno[3,2-c][1]benzazepin-4-one, respectively, are made.

EXAMPLE 5

4-[4-(2-Acetoxyethyl)-1-piperazinyl]-8-chloro-10H-thieno[3,2-c][1]benzazepine

[Process Variant (d)]

0.1 g. of 8-chloro-4-[4-(2-hydroxyethyl) - 1 - piperazinyl]-10H-thieno[3,2-c][1]benzazepine are heated in a steam bath for 15 minutes with 2 cc. of acetic anhydride, and the mixture is subsequently allowed to stand at room temperature for 2½ days. The resulting crystalline product is stirred with 20 cc. of water and after standing at room temperature again dissolved. The almost clear solution is filtered and made alkaline with concentrated ammonia solution. The resulting base is taken up in ether, the ether solution is washed with water and dried with sodium sulphate. The evaporation residue which crystallizes spontaneously is clarified in a chloroform solution on basic aluminium oxide, and after concentrating again by evaporation is crystallized from ether/petroleum ether. The 4-[4-(2 - acetoxyethyl)-1-piperazinyl]-8-chloro-10H-thieno[3,2-c][1]benzazepine, obtained in the form of colourless prisms, has a M.P. of 185–189°.

EXAMPLE 6

8-Chloro-4-(4-methyl-1-piperazinyl)-10H-thieno-[3,2-c][1]benzazepine

[Process Variant (c)]

A solution of 3.1 g. of methyl iodide in 20 cc. of toluene is added dropwise at room temperature, within 20 minutes, while stirring well, to a solution of 12.7 g. of 8-chloro-4-(1-piperazinyl)-10H-thieno[3,2-c][1]benzazepine in 80 cc. of toluene. After allowing to stand overnight at room temperature, the resulting salt precipitate is filtered with suction and washed with toluene. The fairly concentrated toluene solution is subsequently clarified on basic aluminium oxide and subsequently evaporated to dryness. The resulting residue is recrystallized from acetone/petroleum ether. The resulting 8-chloro-4-(4-methyl-1-piperazinyl)-10H-thieno[3,2-c][1]benzazepine has a M.P. of 193–195°.

EXAMPLE 7

4-(4-Methyl-1-piperazinyl)-10H-thieno-[3,2-c][1]benzazepine

[Process Variant (a)]

5.4 g. of 4-amino-10H-thieno[3,2-c][1]benzazepine are heated to 175° in a small stirring autoclave for 24 hours together with 1.5 g. of ammonium chloride and 30 cc. of N-methyl piperazine. The reaction mixture is washed out with 120 cc. of methanol and evaporated to dryness in a vacuum. The residue is taken up in dilute hydrochloric acid, the insoluble material is filtered off from the solution and the solution is made alkaline with concentrated ammonia solution while clarifying with coal. The resulting resin is taken up in ether, the ether solution is washed with water, dried with sodium sulphate and concentrated. The residue is taken up in 1 N acetic acid, the solution is again clarified with coal and made alkaline with concentrated ammonia solution. After extracting with ether and working up as in the first cycle, a purer crude base is obtained, which is subsequently clarified in ether solution on basic aluminium oxide. After recrystallization from ether/petroleum ether, 4-(4-methyl-1piperazinyl)-10H-thieno[3,2-c][1]benzazepine, having a M.P. of 144–147°, is obtained.

By using the processes described in the preceding Examples 1 to 4, 6 and 7, and the corresponding starting materials, compounds of formula I wherein $R_1$ and $R_2$ have the following significance, are obtained:

| Example | $R_1$ | $R_2$ | M.P. |
|---|---|---|---|
| 8 | H | —C(CH$_3$)$_3$ | 147–176° (in maleate form). |
| 9 | 7-CH$_3$ | CH$_3$ | 180–181° from An/Pe. |
| 10 | 7-CH$_3$ | —CH$_2$-CH$_2$-OH | 169–171° from An/Pe. |
| 11 | 7-Cl | CH$_3$ | 184–185° from An. |
| 12 | 7-Cl | —CH$_2$-CH$_2$-OH | 192–194° from AcOEt. |
| 13 | 8-Cl | —CH$_2$-CH$_2$-OH | 202–203° from AcOEt. |

In the above table.—An=acetone; Pe=petroleum ether; AcOEt=ethyl acetate; M.P.=melting point of free base form except where otherwise stated.

What is claimed is:
1. A compound of the formula,

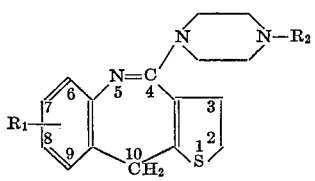

wherein
  $R_1$ is hydrogen, fluorine, chlorine or bromine, or alkyl, alkoxy or alkylthio of 1 to 4 carbon atoms, and
  $R_2$ is hydrogen, alkyl of 1 to 4 carbon atoms, hydroxyalkyl of 1 to 4 carbon atoms, alkyl of 1 to 4 carbon atoms mono-substituted with acetyl, or alkoxyalkyl of 2 to 6 carbon atoms in the aggregate thereof,
or a pharmaceutically acceptable acid addition salt thereof.
2. A compound of Claim 1,
wherein
  $R_1$ is hydrogen or chlorine, and
  $R_2$ is hydrogen, alkyl of 1 to 4 carbon atoms, hydroxyalkyl of 1 to 4 carbon atoms, or alkyl of 1 to 4 carbon atoms mono-substituted with acetyl,
or a pharmaceutically acceptable acid addition salt thereof.
3. A compound of Claim 1;
wherein
  $R_1$ is hydrogen, and
  $R_2$ is alkyl of 1 to 4 carbon atoms or hydroxyalkyl of 1 to 4 carbon atoms,
or a pharmaceutically acceptable acid addition salt thereof.
4. The compound of Claim 1, which is 4-(4-methyl-1-piperazinyl)-10H-thieno[3,2-c][1]benzazepine.
5. The compound of Claim 1, which is 8-chloro-4-(1-piperazinyl)-10H-thieno[3,2-c][1]benzazepine.
6. The compound of Claim 1, which is 7-chloro-4-(1-piperazinyl)-10H-thieno[3,2-c][1]benzazepine.
7. The compound of Claim 1, which is 4-[4-(2-acetoxyethyl) - 1 - piperazinyl] - 8 - chloro-10H-thieno[3,2-c][1]benzazepine.
8. The compound of Claim 1, which is 8-chloro-4-(4-methyl - 1 - piperazinyl) - 10H - thieno[3,2-c][1]benzazepine.
9. The compound of Claim 1, which is 4-(4-tert-butyl-1-piperazinyl)-10H-thieno[3,2-c][1]benzazepine.
10. The compound of Claim 1, which is 7-methyl-4-(4-methyl - 1 - piperazinyl)-10H-thieno[3,2-c][1]benzazepine.
11. The compound of Claim 1, which is 7-methyl-4-[4 - (2 - hydroxyethyl)-1-piperazinyl]-10H-thieno[3,2-c][1]benzazepine.
12. The compound of Claim 1, which is 7-chloro-4-(4-methyl - 1 - piperazinyl)-10H-thieno[3,2-c][1]benzazepine.
13. The compound of Claim 1, which is 7-chloro-4-[4-(2-hydroxyethyl) - 1 - piperazinyl] - 10H - thieno-[3,2-c][1]benzazepine.
14. The compound of Claim 1, which is 8-chloro-4-[4-(2-hydroxyethyl)-1-piperazinyl] - 10H - thieno[3,2-c][1]benzazepine.
14. The compound of Claim 1, which is 8-chloro-4-[4 - (2 - hydroxyethyl) - 1 - piperazinyl] - 10H - thieno-[3,2-c][1]benzazepine.

References Cited
UNITED STATES PATENTS

| 3,389,139 | 6/1968 | Schmutz et al. | 260—268 TR |
| 3,474,099 | 10/1969 | Reinz et al. | 260—268 TR |
| 3,038,896 | 6/1962 | Habicht et al. | 260—268 TR |

DONALD G. DAUS, Primary Examiner

M. C. VAUGHN, Assistant Examiner

U.S. Cl. X.R.

260—239.3 T, 329 R, 332.2 P; 424—250